(12) United States Patent
Johnson, Jr.

(10) Patent No.: US 11,197,460 B2
(45) Date of Patent: Dec. 14, 2021

(54) MOTORCYCLE PET CARRIER

(71) Applicant: Hugh Carl Johnson, Jr., Princeton, TX (US)

(72) Inventor: Hugh Carl Johnson, Jr., Princeton, TX (US)

(*) Notice: Subject to any disclaimer, the term of this patent is extended or adjusted under 35 U.S.C. 154(b) by 306 days.

(21) Appl. No.: 16/281,940

(22) Filed: Feb. 21, 2019

(65) Prior Publication Data
US 2019/0254252 A1    Aug. 22, 2019

Related U.S. Application Data

(60) Provisional application No. 62/633,773, filed on Feb. 22, 2018.

(51) Int. Cl.
*A01K 1/02* (2006.01)
*B62J 9/00* (2020.01)

(52) U.S. Cl.
CPC .......... *A01K 1/0281* (2013.01); *A01K 1/0272* (2013.01); *B62J 9/00* (2013.01)

(58) Field of Classification Search
CPC .......................... A01K 1/0281; A01K 1/0272
See application file for complete search history.

(56) References Cited

U.S. PATENT DOCUMENTS

| 5,577,646 A | * | 11/1996 | White | B62J 11/00 |
| | | | | 224/422 |
| 6,425,349 B1 | * | 7/2002 | Laskin | A01K 1/0245 |
| | | | | 119/496 |
| 2005/0035166 A1 | * | 2/2005 | Kresge | A01K 1/0281 |
| | | | | 224/431 |
| 2013/0220231 A1 | * | 8/2013 | Hovsepian | B62J 9/00 |
| | | | | 119/496 |

FOREIGN PATENT DOCUMENTS

EP              0538542 B1 *  5/1995  .......... A01K 1/0281

* cited by examiner

*Primary Examiner* — Jessica B Wong
(74) *Attorney, Agent, or Firm* — Wilson Daniel Swayze, Jr.

(57) ABSTRACT

A detachable saddle bag pet carrier is disclosed. The carrier comprises a box-like container provided with an upper portion that forms part of the container top. The container includes a plurality of vent openings for circulating air flow inside the carrier. The carrier further comprises a lid hinged to the upper portion of the container. The lid includes one or more air vents that could be adjusted from wide open position to fully closed position. The upper portion comprises a skylight mounted on the lid through which a pet could see the outside environment. The carrier is further provided with a removable foam backed carpet placed underneath the container for the pet. The carrier is mounted on the vehicle using a frame assembly to hold the carrier to the vehicle, thereby a user carries the pet within the carrier.

15 Claims, 8 Drawing Sheets

MOTORCYCLE PET CARRIER

BACKGROUND OF THE INVENTION

A. Technical Field

The present invention generally relates to a detachable pet carrier device for easy transportation. More specifically, the present invention relates to a carrier device attached to a back of a vehicle for carrying pet animals or small items.

B. Description of Related Art

Generally, people who love and care for pets, they treat them as extensions of their family The enjoyment and pleasure derived from owning a pet compel individuals to spend as much time as possible with them. The attitude towards pets may vary between individuals but people love them, and in many instances, they are like surrogate children. The treatment they receive would bear the case out with the vast majority of owners or "parents" of pets. They want to take their pets everywhere they go, especially when it's an outing for entertainment. The most popular species of animals recruited for pets are the usual domesticated dogs and cats. Since century's domestication bred into dogs and cat's genes hence, they are the most suited animals for such a role.

Pets have become so much of people's lives that they want them to be in their company as much as possible. Travel is one of the favorites time a pet's owner will want to keep their pets with them. However, leaving a pet when traveling away from home creates separation anxiety for not only the owners but for the pet as well. The owners of the animal know where they are going and that they are planning to come back, but the pet does not. One of the best ways to travel with a pet is road trips.

A road trip by automobile has many advantages for taking the family pet(s). Currently, if the user wants to take the cat or small to medium dog along on the trip, they must ride in a support automobile, or if there is not one with the group, must ride in a back pack or a cleverly mounted pet carrier on the motorcycle. The problem with these hybrid solutions is that they take up considerable room on the motorcycle and often do not allow a passenger to accompany the rider, or the pet carrier mounting is cumbersome and may be unsafe for the pet or rider(s). In general, numerous types of carriers used to retain and transport a pet, primarily a small dog or cat, from one location to another are known.

Some carriers have been placed on wheels to facilitate transport but are usually too large to fit to a vehicle. Taking a pet along on a motorcycle ride has always been a situation that many people have tried to solve by various means from employing sidecars to strapping the creature to the machine onto the rider or other homemade, and sometimes dubious solutions. The carrying handle in such carriers is also rigid and requires the carrier to be rolled at an angle while the pet owner is pulling the rolling carrier, thereby leading to the pet's discomfort.

Therefore, there is a need for a unique design of a pet carrier to safely and comfortably carry the pet animal. Further, there is also a need for a portable pet carrier, for easy carrying during a road trip and view the pet status easily.

SUMMARY OF THE INVENTION

The present invention relates to a detachable saddle bag pet carrier. The carrier comprises a container with a lid. In one embodiment, the container is configured to receive a pet animal. The lid is hinged to an end of the upper portion of the container, thereby enabling the user to access the container. In one embodiment, the container comprises a foam backed carpet to provide comfort for the pet animal. The container further comprises a plurality of vent openings on a rear portion for circulating air flow inside the carrier. In one embodiment, the container further comprises a handle. The handle is affixed to one of a side portion of the container.

In one embodiment, the lid comprises one or more air vents. The air vents are configured to adjust from wide open position to fully closed position for regulating air flow inside the carrier to maintain the animal's body temperature. In one embodiment, the lid further comprises a push latch button, wherein the push latch button is configured to lock the lid to the container for preventing inadvertent release of the lid.

In one embodiment, the carrier further comprises a transparent skylight. In one embodiment, the transparent skylight is in dome-shaped structure. In some embodiments, the transparent skylight is made of polycarbonate plastic. The transparent skylight is removably positioned on the lid, configured to allow the pet animal to view outside environment. In one embodiment, the carrier is made of a metal includes a steel and an aluminum. In another embodiment, the carrier is made of a material includes a light-weight material and plastic.

In one embodiment, the carrier further comprises a frame assembly detachably mounted to the vehicle. In one embodiment, the frame assembly is configured to hold the detachable saddle bag pet carrier to the vehicle, thereby enabling the user to safely and comfortably carry the pet animal within the container. In one embodiment, the vehicle is at least any one of a motorcycle and a bike.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
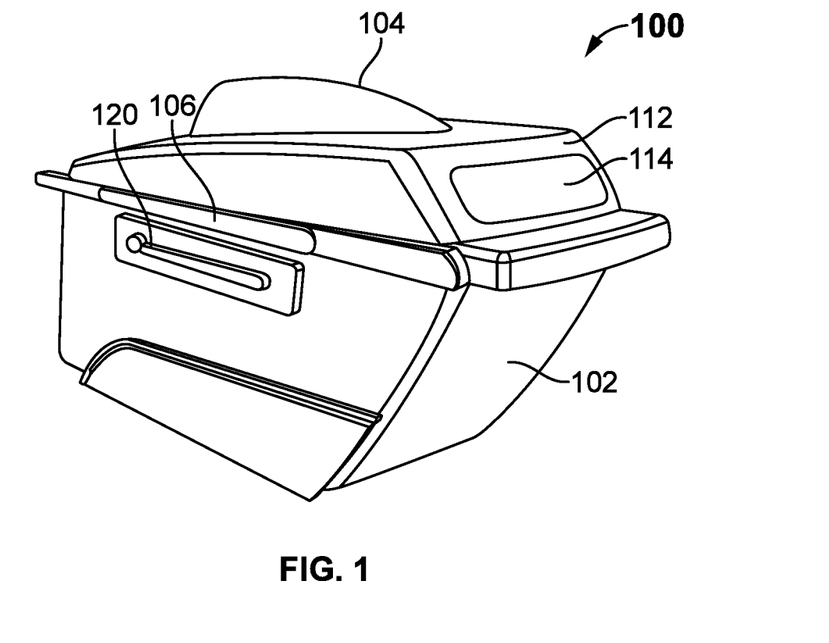
FIG. 1 shows a perspective view of a detachable saddle bag pet carrier to be carried by a user during travel, according to an embodiment of the present invention.

Referring to FIG. 1, a perspective view of a detachable saddle bag pet carrier 100 to be carried by a user is disclosed. In an embodiment, the detachable saddle bag pet carrier 100 provides an innovative and unique solution for carrying pet animals. The detachable saddle bag pet carrier 100 comprises a container 102 provided with an upper portion that forms part of the container top. The upper portion of the detachable saddle bag pet carrier 100 comprises a lid 112. In one embodiment, the lid 112 is hinged to an end of the upper portion of the container, thereby enabling the user to access the container. In one embodiment, the lid 112 further comprises a push button latch 120 to insure the pet safety configured to lock the lid to the container for preventing inadvertent release of the lid. In one embodiment, the lid 112 further comprises one or more air vents 114. The air vents 114 are configured to adjust from wide open position to fully closed position for regulating air flow inside the carrier 100 to maintain the animal's body temperature. The carrier 100 is further configured with a transparent skylight 104 mounted on the lid 112. In one embodiment, the transparent skylight 104 is configured to allow the pet animal to view the outside environment and the user or rider could observe the animal's condition via the transparent skylight 104. The carrier 100 is further configured with a handle 106 on any one of a side portion of the container 102, according to an embodiment of the present invention. The carrier 100 could be mounted to the vehicles using a frame assembly 108, one or more cushioning mounts and fasteners. In an embodiment, the carrier 100 is made from a metal, for example, but not limited to, steel and aluminum.

Figure 2:
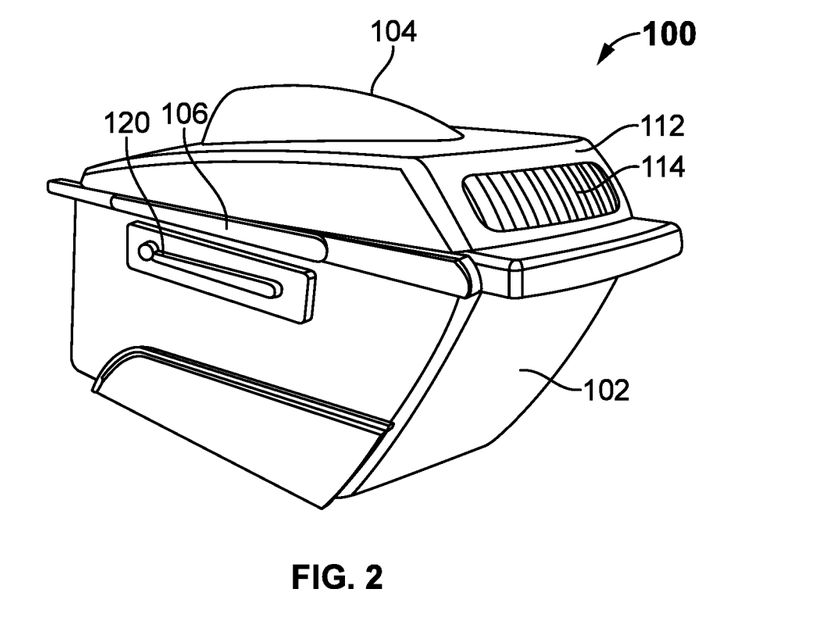
FIG. 2 illustrates a perspective view of the detachable saddle bag pet carrier showing the adjustable air vents, according to an embodiment of the present invention.

Referring to FIG. 2, illustrates a perspective view of the detachable saddle bag pet carrier showing the adjustable air vents 114, according to an embodiment of the present invention. The air vents 114 allows the air flow inside the carrier 100 to maintain the animal's body temperature at the optimum level. The carrier 100 is designed for mounting on either side portion of the vehicle such as, but not limited to, a motorcycle and a bike using the frame assembly 108. Preferably, the detachable saddle bag pet carrier 100 is made of a material includes, but not limited to, a light-weight material and plastic.

Figure 3:
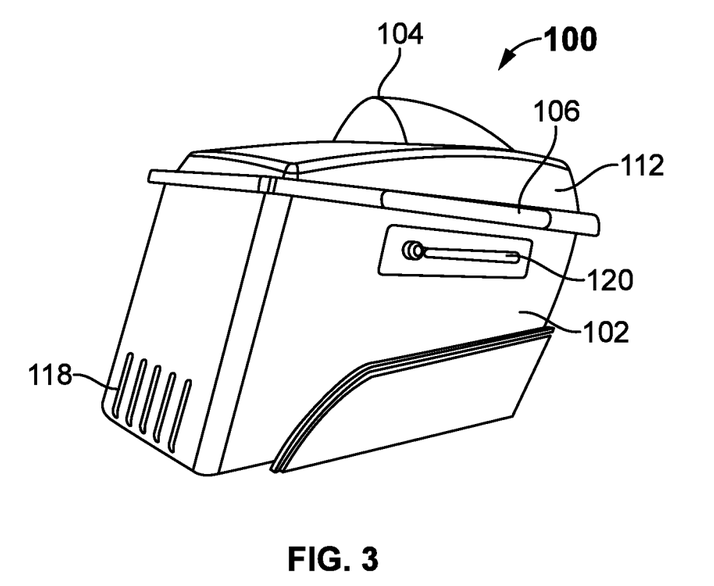
FIG. 3 shows a side perspective view of the detachable saddle bag pet carrier according to an embodiment of the present invention.

FIG. 3 illustrates a side perspective view of the detachable saddle bag pet carrier 100, which is configured with a plurality of vent openings 118 on the rear portion of the container 102 for circulating air flow. The vent openings 118 are kept open to allow the air flow to circulate inside the carrier 100. The transparent skylight 104 is removably positioned on the lid of the carrier 100 via wing screws and PEM® style nuts. The upper section of the transparent skylight 104 could be removed from the sealed-in lip to allow the pet animal to observe the smell and view the outside environment more intimately during a travel. In one embodiment, the push button latch 120 is configured to lock the lid 104 to the container for preventing inadvertent release of the lid 112.

Figure 4:
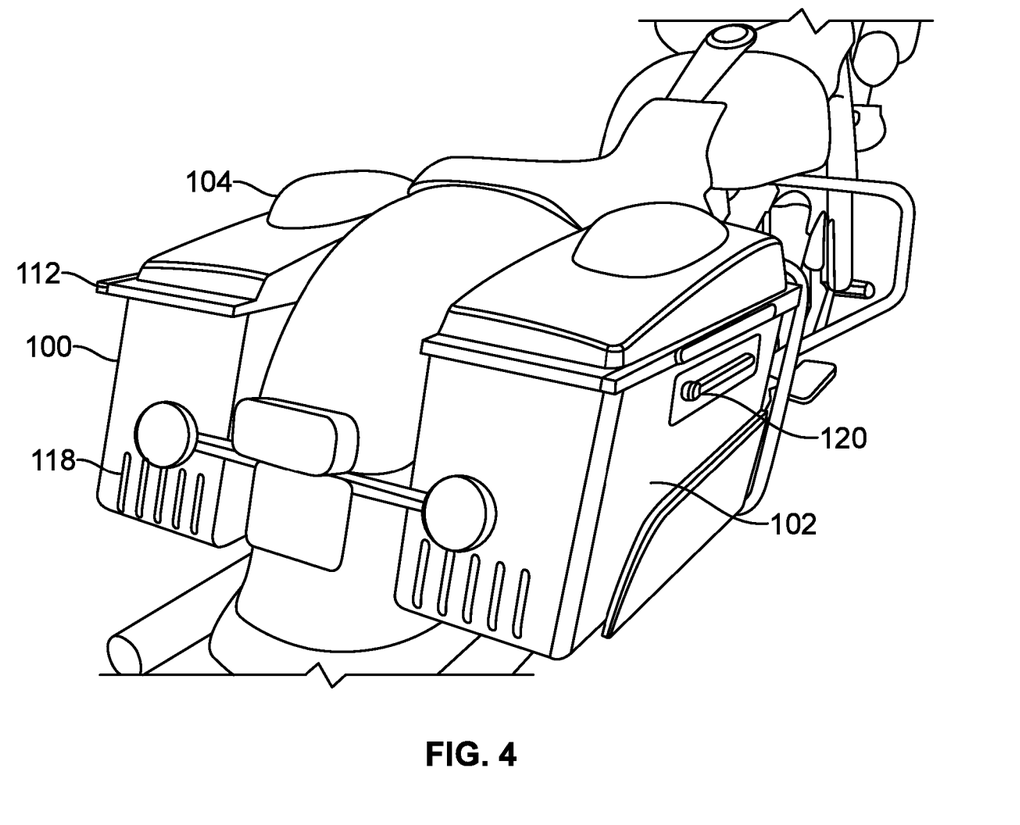
FIG. 4 illustrates the attachment of the detachable saddle bag pet carrier on both sides of the vehicle, according to an embodiment of the present invention.

FIG. 4 illustrates the attachment of the detachable saddle bag pet carrier 100 on both sides of the vehicle. The carrier 100 are durable than normal saddle bags and used for common items carried along on the ride, when the pet animal is not being taken along. The carrier 100 is blow molded using ⅜" thick ABS (Acrylonitrile Butadiene Styrene) plastic. The carrier 100 is molded into the desired shape and the vent openings 118 and the push button latch 120 are formed at the initial step of molding.

Figure 5A:
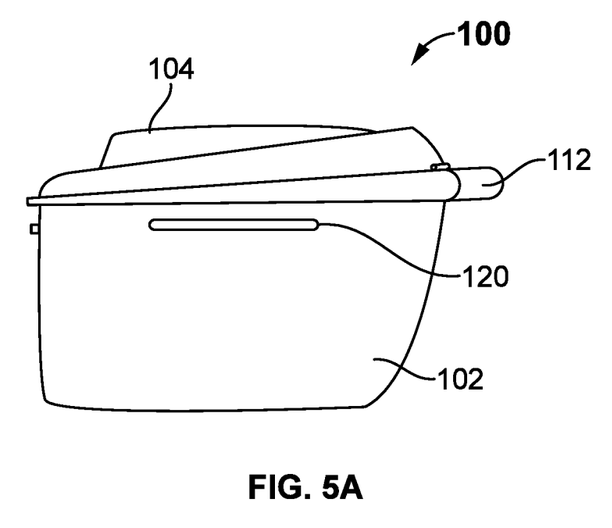
FIG. 5A illustrates a side view of the detachable saddle bag pet carrier, according to an embodiment of the present invention.

FIG. 5A illustrates a side view of the detachable saddle bag pet carrier, according to an embodiment of the present invention. The skylight 104 is formed using polycarbonate plastic sheet and high temperature vacuum forming to make the curved shape. In one embodiment, the skylight 104 is a dome. In one embodiment, the skylight 104 is made of a transparent material. The vent openings 118 on the rear portion of the container 102 allow the outside air to circulate inside to provide minimal air circulation for the pet animal comfort. The lower portion of the detachable saddle bag pet carrier 100 and raised internal edges are formed in the first step of the molding process. The lid 112, the openings for the adjustable air vents 114 and the skylight 104 are formed in the similar molding process.

Figure 5B:
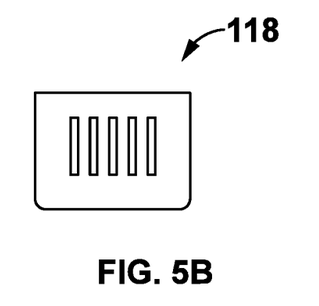
FIG. 5B illustrates a side view of the adjustable air vents of the detachable saddle bag pet carrier, according to an embodiment of the present invention.

FIG. 5B illustrates a side view of the adjustable air vents 114 of the detachable saddle bag pet carrier, according to an embodiment of the present invention. The adjustable air vents 114 openings could be adjusted according to the outside temperature.

Figure 5C:
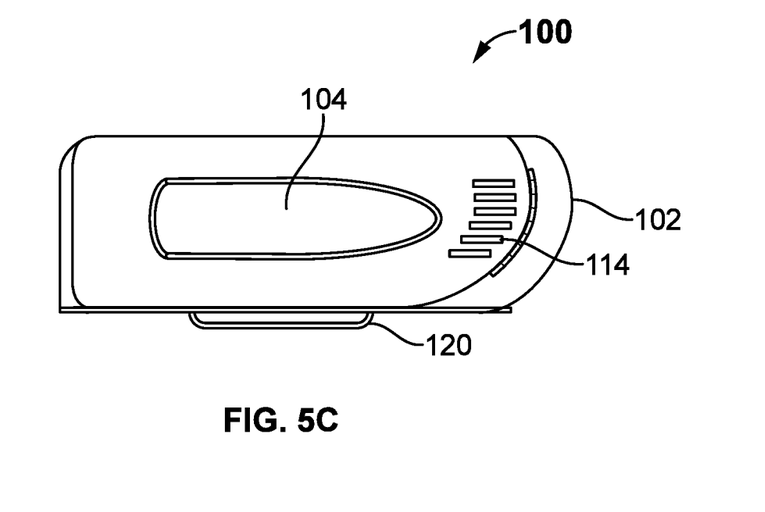
FIG. 5C shows a top view of the detachable saddle bag pet carrier, according to an embodiment of the present invention.
Figure 5D:
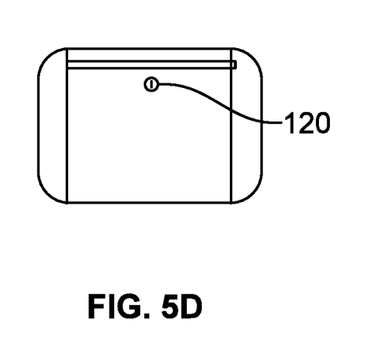
FIG. 5D shows the elevation view of push button latch of the detachable saddle bag pet carrier, according to an embodiment of the present invention.

FIG. 5C shows a top perspective view of the detachable saddle bag pet carrier 100, according to an embodiment of the present invention. The skylight 104 sheds water, ice, and snow, while allowing the pet to see outside environment and scenery while travelling. The front surface of the detachable saddle bag pet carrier 100 has adjustable air vents 114 that could be infinitely adjusted between open and closed for the pet's comfort. The detachable saddle bag pet carrier 100 is easy to clean. FIG. 5D shows the elevation view of the push button latch 120 of the detachable saddle bag pet carrier 100, according to another embodiment of the present invention. The push button latch 120 could be positioned on, but not limited to, a rear side of the detachable saddle pet carrier 100. The push button latch 120 in the rear side of the detachable saddle pet carrier 100 is lockable for preventing theft or inadvertent release of the pet. The push button latch 120 is supplied with the mounting hardware and two keys.

Figure 5E:
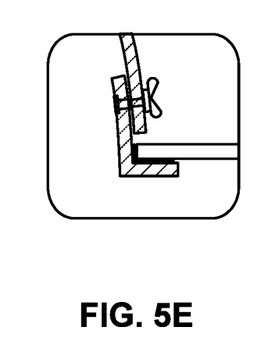
FIG. 5E shows the inside view of transparent skylight of the detachable saddle bag pet carrier.

FIG. 5E shows the inside view of skylight 104 of the detachable saddle bag pet carrier 100. The skylight 104 is transparent and could be metalized to reduce the sun gain in warmer climates and if desired could be removed based on the requirements. The transparent skylight 104 is further configured to allow the user or to view the pet animal's condition placed in the container 102 of the carrier 100.

Figure 6:
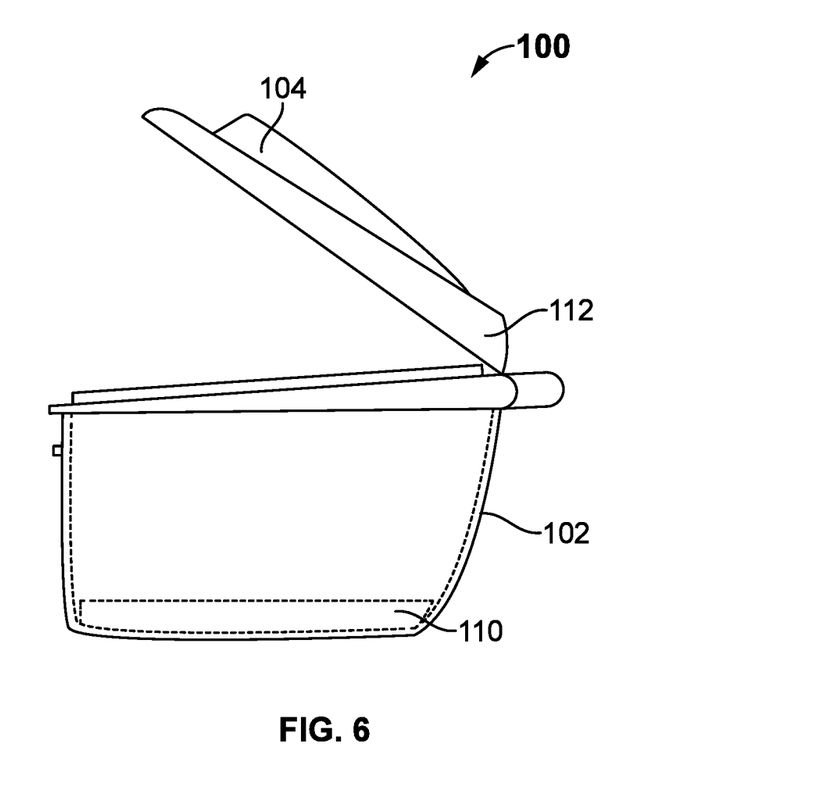
FIG. 6 shows an operational view of the detachable saddle bag pet carrier, according to an embodiment of the present invention.

FIG. 6 shows an operational view of the detachable saddle bag pet carrier 100, according to an embodiment of the present invention. The container 102 is provided with a foam backed carpet 110 to provide comfort for the pet animal. The carrier 100 could be painted normally with a standard gloss black paint, which could be re-painted to match or contrast with the vehicle such as motorcycle. The foam backed carpet 110 is removable for machine washing and line drying. The underside of the lid 112 fits over the raised wall and seals around it to prevent water or wind entry. The lid 112 is hinged to an end of the upper portion of the container, thereby enabling the user to access the container 102 via the push button latch 120. Then transparent skylight 104 is bonded into place using, but not limited to, a silicone adhesive to provide a waterproof and theft resistant for the lid 112.

Figure 7A:
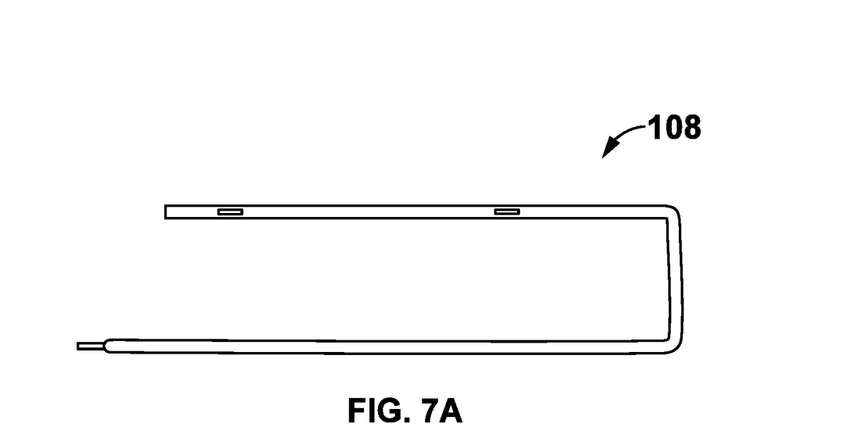
FIGS. 7A and 7B shows a mounting frame assembly of the detachable saddle bag pet carrier, according to an embodiment of the present invention.
Figure 7B:
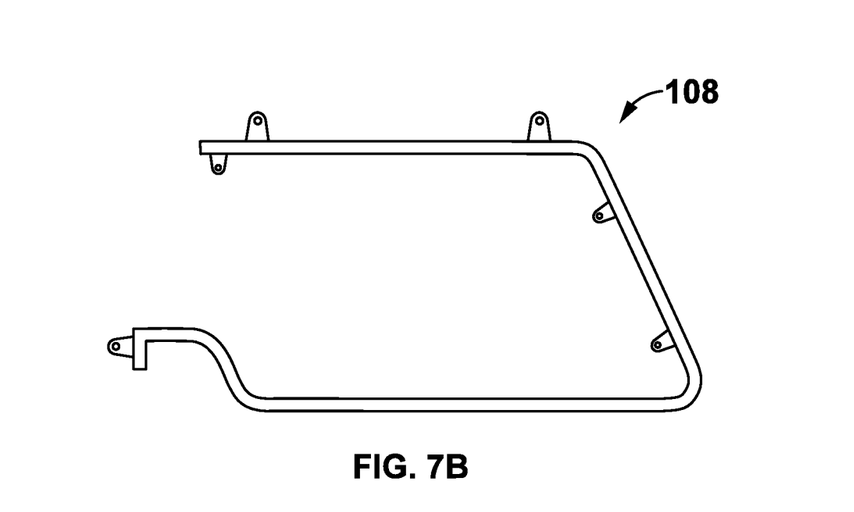

Referring to FIG. 7A & 7B, shows a mounting frame assembly of the detachable saddle bag pet carrier 100, according to an embodiment of the present invention. The frame assembly 108 is designed to a customized vehicle, for example, a motorcycle or a bike. The carrier 100 could be fixed to 185 different models. The frame assembly 108 is universal such that they could be adapted to fit to the customized vehicle, for example, a motorcycle. The method of producing the carrier 100 starts by using a ⅝" diameter thick wall aluminum tubing that is cut to length. In a preferred embodiment, a thick wall aluminum tubing is hydraulically bent to the desired shape. The ends are formed into a cup and TIG welded to seal the tubing. Then the tubing is formed in a computer controlled hydraulic bender. After forming, the stamped brackets are positioned in a jig and robotically TIG welded to make the right or left mounting frame. After welding, the frames are cleaned, powder painted, and thermally cured. This gloss black coating is durable and highly resistant to scratching, and corrosion. Each mounting frame assembly 108 is gathered with the mounting hardware and fasteners and is inserted in the cardboard shipping carton with the appropriate padding. In some embodiments, the carrier 100 comprises one or more handles to provide ease in operation during the travel. The back powder painted surface reduces scratching and corrosion.

In a preferred embodiment, the mounting frame assembly 108 polished stainless-steel trim is adhesively bonded and bolted to the outside of the detachable saddle bag pet carrier 100. The foam backed carpet 110 is adhesively bonded to the interior surface of the carrier 100. The push button latch 120 and the air vents 114 are screwed into place. After fabrication, the right and left bags are boxed for shipment in appropriately marked cardboard cartons. The curved shape detachable saddle bag pet carrier 100 could be customized based on the fitting requirements. After molding, all the plastic components (except the transparent skylight 104) are roughened using robotic sanding techniques, cleaned with a solvent based de glosser, and then are robotically painted using a glossy black, UV resistant paint. The frame assembly 108 is designed in such a way keeping the carrier 100 intact and protect the pet animal during an accident or a crash.

According to preferred embodiment, the detachable saddle bag pet carrier 100 is designed to be aesthetic and effective in application. The user benefits from improved style ease of use, and pet comfort and safety. Further, the carrier 100 is unique as it comes for rider taking the pet during travelling. The carrier 100 is vented sidewise and in the upper portion to keep pet animal in optimum temperature. Further, during travel, the transparent skylight 104 helps to visualize the pet condition. The carrier 100 could be rigid, flexible, resilient and combinations thereof. The carrier 100 could be made from various materials as long as the materials are sufficiently strong to contain the pet animal when the carrier 100 is in use. The transparent skylight 104 is made of a material such as, but not limited to, polycarbonate plastic which allows the pet animal to put their head out of the carrier 100. The carrier 100 is available in different sizes for fitting with different vehicles. Further, base portion is occupied with removable/detachable foam backed carpet 110 for pet's comfort. Hinges are situated on the leading edge of the detachable saddle bag pet carrier 100 for preventing accident. Standard hardware is used to fit the detachable saddle bag pet carrier 100 to vehicles, for example, but not limited to, the motorcycles and bikes. It is perfect for safe and comfortably carrying the pet animal.

Preferred embodiments of this invention are described herein, including the best mode known to the inventors for carrying out the invention. It should be understood that the illustrated embodiments are exemplary only, and should not be taken as limiting the scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A detachable saddle bag pet carrier for a vehicle, comprises: a container with a lid, configured to receive a pet animal, wherein the lid is hinged to an end of the upper portion of the container, thereby enabling the user to access the container; a transparent skylight removably positioned on the lid, wherein the transparent skylight is configured to allow the pet animal to view outside environment; and a frame assembly detachably mounted to the vehicle, configured to hold the detachable saddle bag pet carrier to the vehicle, thereby enabling the user to safely and comfortably carry the pet animal within the container, wherein the lid comprises one or more air vents, wherein the air vents are configured to adjust from wide open position to fully closed position for regulating air flow inside the carrier to maintain the animal's body temperature.

2. The carrier of claim 1, is made of a metal includes a steel and an aluminum.

3. The carrier of claim 1, is made of a material includes a light-weight material and plastic.

4. The carrier of claim 1, wherein the container comprises a foam backed carpet to provide comfort for the pet animal.

5. The carrier of claim 1, wherein the container further comprises a plurality of vent openings on a rear portion for circulating air flow inside the carrier.

6. The carrier of claim 1, wherein the lid further comprises a push latch button, wherein the push latch button is configured to lock the lid to the container for preventing inadvertent release of the lid.

7. The carrier of claim 1, wherein the transparent skylight is in dome-shaped structure.

8. The carrier of claim 1, wherein the transparent skylight is made of polycarbonate plastic.

9. The carrier of claim 1, further comprises a handle.

10. The carrier of claim 1, wherein the vehicle is at least any one of a motorcycle and a bike.

11. A detachable saddle bag pet carrier for a vehicle, comprises:
  a container with a lid, wherein the container comprises a plurality of vent openings for circulating air flow inside the carrier;
  wherein the lid hinged to an end of the upper portion of the container, thereby enabling the user to access the container, said lid comprises one or more air vents,
  wherein an air vent of the one or more lid air vents is configured to adjust from wide open position to fully closed position by the user for regulating air flow inside the carrier to maintain the animal's body temperature;
  a transparent skylight removably positioned on the lid, wherein the transparent skylight is configured to allow the pet animal to view the outside environment;
  a handle affixed to the container; and
  a frame assembly adapted to detachably mounted to the vehicle, configured to hold the detachable saddle bag pet carrier to the vehicle, thereby enabling the user to safely and comfortably carry the pet animal within the container.

12. The carrier of claim 11, is made of a metal includes steel and aluminum.

13. The carrier of claim 11, is made of a material includes a light-weight material and plastic.

14. The carrier of claim 11, wherein the container comprises a foam backed carpet to provide comfort for the pet animal.

15. The carrier of claim 11, wherein the transparent skylight is in dome-shaped structure.

* * * * *